United States Patent Office 2,889,377
Patented June 2, 1959

2,889,377

CHLOROALKYLATION OF AROMATIC COMPOUNDS

Vernon Deane Floria, Midland, Mich., assignor to The Dow Chemical Company, Midland, Mich., a corporation of Delaware No Drawing. Application January 30, 1957
Serial No. 637,061

7 Claims. (Cl. 260—651)

This invention relates to the chloroalkylation of aromatic compounds.

Certain sulfonated alkenyl aromatic products are of practical interest for use in the preparation of polymers and for other applications. It is very difficult, however, if not impossible, to sulfonate most alkenyl aromatics directly. As an alternative, resort is generally made to preliminary "blocking" reactions on alkenyl aromatic compounds that are desired to be ring sulfonated. These are followed by sulfonation of the "blocked" intermediate and conversion to the sulfonated alkenyl aromatic by removal of the "blocking" group. Thus, by way of typical illustration, styrene (which in and of itself is not susceptible to the satisfactory direct sulfonation of its aromatic nucleus) may, according to the process of U.S. 2,082,946, first be hydrobrominated to make a 2-bromoethyl benzene intermediate. This intermediate may then be sulfonated and subsequently dehydrobrominated to yield the desired ring sulfonated monomeric product.

Considered both "price-wise" and "weight-wise," an intermediate sulfonatable and dehydrohalogenatable chloro compound would be preferable to the analogous bromo compound for the derivation of ring sulfonated alkenyl aromatics. Such desideration, however, has heretofore been elusive of achievement. Despite their economic attractiveness, the indicated type of "blocking" reactions on alkenyl aromatic compounds are ordinarily inoperable with hydrogen chloride. It is a known parodox, for example, that hydrogen chloride will not add to styrene in the same way as will hydrogen bromide. Chlorination procedures also generally fail to provide suitable sulfonatable and dehydrohalogenatable intermediates from alkyl aromatic compounds that correspond to the desired alkenyl aromatic products. Thus, when ethylbenzene is chlorinated in the side chain, there is obtained 1-chloroethyl benzene. This compound is relatively unstable and is not amenable to being sulfonated to a ring sulfonated product.

It would be advantageous, and it is the principal object of the invention, to provide a method for chloroalkylating aromatic compounds in order readily to provide intermediate materials that are adapted to be ring sulfonated and subsequently dehydrohalogenated to desirable sulfonated alkenyl aromatic compounds. A particular objective of the invention, of especial advantage, is to provide a method well suited for the preparation of 2-chloroethyl benzene from benzene in order to create, on practical terms, an attractive source for sulfonated styrene monomer.

Accordingly, aromatic compounds of the hereinafter identified nature may advantageously be chloroalkylated to provide 2-chloroalkyl aromatics by a method which comprises reacting the aromatic compound, in the presence of a titanium tetrachloride, titanium tetrafluoride or titanium trichloride catalyst, with a reagent of the general structure: $(ClCHGCH_2O)_2O_2S$; wherein G is a hydrogen atom or a methyl or ethyl radical. A 2-chloroalkyl aromatic product may thus be prepared in which the substituent group has the same structural arrangement as the chloroalkyl substituents in the above-identified reagent. The product may be recovered from the reaction mass in which it is obtained after the reaction has been terminated by any of several conventional procedures that are suitable for the purpose.

The reaction can generally be conducted at temperatures between about room temperatures and the decomposition temperatures of the particular materials that are involved. For most materials that may be employed, however, it is advantageous to employ a temperature of reaction that is between about 40 and 120° C. As is apparent, the reaction is adapted to be performed under atmospheric or superatmospheric pressures. The latter may be autogenous when operating at elevated temperatures exceeding the normal boiling points of certain of the reactants that may be employed. Ordinarily, the reaction can be suitably terminated after periods of from one to four hours. The optimum reaction time in a specific instance may be found to depend somewhat on the particular reactants involved, the concentration of catalyst that is being utilized and the conditions of the reaction that are involved. At times, it may be preferred to terminate the reaction before all of the chloroalkylating reagent has been utilized. This may avoid obtaining inordinate and undesirable quantities of by-product materials, such as bibenzyl, bitolyl and the like and disubstituted products, depending upon the particular reactants that are involved. The chloroalkylated product can ordinarily be recovered by distillation of the aromatic constituents from the reaction mass after it has been extracted with water or equivalent solvents to remove the water soluble constituents therefrom.

The aromatic compounds that may be chloroalkylated in the practice of the invention include benzene, substituted benzenes, naphthalene, substituted naphthalenes and the like aromatics which may be generically represented by the following:

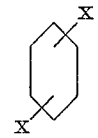

and

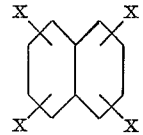

wherein each X may independently be a hydrogen atom or an alkyl substituent containing from one to four carbon atoms. Many of such aromatic hydrocarbons may be typified as being members of the class that are available from coal tar (and, of course, from other sources) that boil under standard conditions at temperatures between about 80 and 250° C. Besides benzene and naphthalene, toluene, ethylbenzene, the xylenes and the methylnaphthalenes may be mentioned as being of particular benefit and useful species to employ in the practice of the present invention. It may be beneficial when certain aromatics such as naphthalene and the like are being chloralkylated to carry out the reaction in an inert solvent vehicle, such as pentane or other saturated hydrocarbon, in order to minimize difficulty in the handling of the aromatic.

Typical of the chloroalkylating reagents that may be used are bis-(2-chloroethyl) sulfate and bis-(2-chloroisopropyl) sulfate. The ratio of the chloroalkylating reagent to the aromatic compound that is employed is not especially critical in the practice of the invention. Generally, however, the reactants should be employed in a ratio of at least about one molar quantity of the chloroalkylating reagent to each twenty-five moles of the aromatic compound that is being chloroalkylated. Up to equimolar proportions may be utilized. In many instances, better results seem to occur when the mole ratio of the chloroalkylating reagent to the aromatic compound is less than one to five, respectively, especially when benzene is involved. When benzene is being chloroalkylated, it is of great value to accomplish the reaction with bis-(2-chloroethyl) sulfate in order to obtain an intermediate for the advantageous manufacture of sulfonated styrene monomer.

When the mentioned titanium tetrahalide compounds are employed as catalysts and the reaction is conducted under atmospheric pressure, it is preferred to use at least about equimolar proportions of the catalyst with the chloroalkylating reagent. About a 10 percent molar excess of the catalyst may thus be beneficial. The titanium trichloride catalyst may be employed in proportions that are less than equimolar with the chloroalkylating reagent, say in respective mole ratios that are as low as 0.5:1. However, when the reaction is performed under superatmospheric pressure or at elevated temperatures, or both, and when relatively greater concentrations of the chloroalkylating reagent are present in the aromatic compound that is being chloroalkylated, smaller proportions of the catalyst may usually be employed with satisfactory results. Thus, when benzene is being chloroethylated at elevated temperatures in excess of its boiling point and under superatmospheric pressure, mole ratios of titanium tetrachloride to the chloroalkylating reagent that are as low as 0.05:1, respectively, may be employed. Titanium trichloride may generally be reused as a catalyst after its recovery from the reaction mass.

The invention is further illustrated in and by the following examples.

*Example 1*

About 39.0 grams (0.5 mole) of benzene, 22.3 grams (0.10 mole) of bis (2-chloroethyl) sulfate and 21.2 grams (0.11 mole) of titanium tetrachloride were added together to a 500 milliliter flask and refluxed for about an hour. At the end of this period, about 30 milliliters of ethanol was added to the reaction mass after it had been cooled, and the resulting mixture extracted with water. The benzene layer, after the aqueous extraction, was then distilled. About 4.5 grams of 2-chloroethyl benzene was recovered under an absolute mercury pressure of about 4 millimeters in the temperature range from 75 to 115° C. The product had a refractive index ($n_d^{25.4}$) of about 1.5254. About 4.4 grams of unreacted sulfate was also obtained from the reaction mass. Based upon the quantity of chloroalkylating reagent that was employed, about a 47 percent yield of the desired product was obtained. Bibenzyl was also formed as a by-product of the reaction.

*Example 2*

The procedure of the first example was repeated with about 25 milliliters (0.282 mole) of benzene, 8.9 grams (0.04 mole) of the sulfate and 6.2 grams (0.05 mole) of titanium tetrafluoride. About a 30 percent yield (1.5 grams) of product 2-chloroethyl benzene was obtained. About 5 grams of unreacted sulfate was recovered. Based upon the amount of sulfate reagent that was employed, about a 60 percent yield was obtained in the reaction.

*Example 3*

The procedure of Example 1 was repeated excepting to substitute about half the molar quantity of titanium trichloride as a catalyst. Commensurate results were achieved.

*Example 4*

Similar results were obtained when the procedures of Examples 1, 2 and 3 were repeated excepting to substitute toluene for benzene as the aromatic compound and to obtain 2-chloroethyl toluene as the product. Varying relatively small quantities of bitolyl were obtained as by-product.

In contrast with the foregoing, when aluminum trichloride and ferric chloride were tested as catalysts, the bis-(2-chloroethyl) sulfate reagent was found to be decomposed and very large quantities of by-product bibenzyl were obtained. No reaction was achieved under the above conditions when stannic chloride, sulfuric acid and hydrochloric acid were tested as catalysts.

Excellent results may also be obtained when ethyl benzene, xylene, naphthalene and the like aromatics are chloroalkylated with bis (2-chloroethyl) sulfate or the same aromatics (including benzene and toluene) are reacted in the presence of the indicated catalysts with bis-(2-chloroisopropyl) sulfate and the other chloroalkylating reagents with the scope of the invention.

The purview of the present invention is to be gauged in the light of the hereto appended claims, rather than strictly from the foregoing illustrative description and specification.

What is claimed is:

1. Method for chloroalkylating an aromatic compound taken from the class of aromatic compounds consisting of those having the formulae:

and

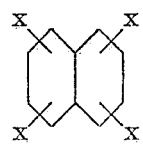

wherein each X is independently selected from the group consisting of hydrogen atoms and alkyl radicals containing from one to four carbon atoms, said method comprising mixing the aromatic compound, in the presence of a catalyst selected from the group consisting of titanium tetrachloride, titanium tetrafluoride and titanium trichloride, with a chloroalkylating reagent of the general structure: $(ClCHGCH_2O)_2O_2S$, wherein G is a radical selected from the group consisting of a hydrogen atom, a methyl radical, and an ethyl radical; and maintaining the mixed ingredients for a time sufficient to form a 2-chloroalkylated aromatic product at a temperature between about room temperature and the lowest decomposition temperature of the reactant ingredients.

2. The method of claim 1, wherein the mixed ingredients are reacted at a temperature between about 40° and 120° C.

3. The method of claim 1, and including the additional step of recovering the 2-chloroalkylated aromatic product from the reaction mixture after the reaction has been terminated.

4. The method of claim 1, wherein the chloroalkylating reagent is bis-(2-chloroethyl) sulfate.

5. The method of claim 1, wherein the aromatic compound is toluene.

6. Method for chloroalkylating benzene which comprises mixing the benzene, in the presence of a catalyst selected from the group consisting of titanium tetrachloride, titanium tetrafluoride and titanium trichloride with a chloroalkylating reagent of the general structure: $(ClCHGCH_2O)_2O_2S$, wherein G is a radical selected from the group consisting of a hydrogen atom, a methyl radical and an ethyl radical; maintaining the mixed ingredients for a time sufficient to form a chloroalkylated benzene product at a temperature between about 40° and 120° C.; then, after the reaction has been terminated, recovering a 2-chloroalkylated benzene product from the reaction mixture.

7. The method of claim 6, wherein the chloroalkylating reagent is bis-(2-chloroethyl) sulfate.

References Cited in the file of this patent
UNITED STATES PATENTS 2,714,125   Gerner et al. ---------- July 26, 1955

FOREIGN PATENTS 787,655   France ------------------ July 8, 1935

OTHER REFERENCES

Stephen et al.: "Jour. Chem. Soc.," 1920, pp. 510–524.
Adams et al.: "Organic Reactions," vol. I, pp. 66, 67, 72 and 73 (1942).